United States Patent
Emmot et al.

(10) Patent No.: US 6,724,396 B1
(45) Date of Patent: Apr. 20, 2004

(54) GRAPHICS DATA STORAGE IN A LINEARLY ALLOCATED MULTI-BANKED MEMORY

(75) Inventors: Darel N Emmot, Ft Collins, CO (US); Byron A Alcorn, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 415 days.

(21) Appl. No.: 09/586,412

(22) Filed: Jun. 1, 2000

(51) Int. Cl.[7] .................................................. G09G 5/00
(52) U.S. Cl. ..................................... 345/587; 345/582
(58) Field of Search ....................... 710/35; 365/230.01, 365/230.03; 382/296; 711/209; 345/543, 587, 582, 552, 544, 503, 589, 538, 428

(56) References Cited

U.S. PATENT DOCUMENTS 5,801,708 A * 9/1998 Alcorn et al. ............... 345/430
5,864,512 A * 1/1999 Bucklew et al. ........ 365/230.01

* cited by examiner

Primary Examiner—Matthew C. Bella
Assistant Examiner—Dalip Singh

(57) ABSTRACT

Methods and apparatus are provided for allocating correlated data sets, such as texture data, among first and second areas of memory in a computer graphics system. Each texture map in a series of texture maps is divided into a set of blocks of data. Each texture map that has a width greater than one block is divided into first and second map areas. Typically, the first and second map areas are the left and right halves of each texture map. Blocks of data from the first map areas of odd level texture maps are stored in the first memory area, blocks of data from the second map areas of even level texture maps are stored in the first memory area, blocks of data from the second map areas of odd level texture maps are stored in the second memory area and blocks of data from the first map areas of even level texture maps are stored in the second memory area. The blocks of data representing each texture map in the series of texture maps are stored in consecutive blocks of memory. The disclosed technique for allocating texture data to memory provides high performance during texture mapping operations.

28 Claims, 13 Drawing Sheets

|  | 242 | 24 ↓ | | 240 | | 244 | |
|---|---|---|---|---|---|---|---|
| 140 — 0 | 1 | 2 | 3 | 4 | 5 | 6 | 7 |
| 142 — 8 | 9 | A | B | C | D | E | F |
| 144 — 10 | 11 | 12 | 13 | 14 | 15 | 16 | 17 |
| 148 — 18 | 19 | 1A | 1B | 1C | 1D | 1E | 1F |

| 0 | 1 | 2 | 3 | ~182
| 4 | 5 | 6 | 7 | ~184
| 8 | 9 | A | B | ~186
| C | D | E | F | ~188
| 10 | 11 | 12 | 13 |

164, 180

BS=8

| 0 | 1 | 2 | 3 | 4 | 5 | 6 | 7 |
|---|---|---|---|---|---|---|---|
| 8 | 9 | A | B | C | D | E | F |
| 10 | 11 | 12 | 13 | 14 | 15 | 16 | 17 |
| 18 | 19 | 1A | 1B | 1C | 1D | 1E | 1F |

166 points to cell "4" in the first row.

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| 10 | 11 | 12 | 13 | 14 | 15 | 16 | 17 | 18 | 19 | 1A | 1B | 1C | 1D | 1E | 1F |

168 points to cell "6" in the first row.

GRAPHICS DATA STORAGE IN A LINEARLY ALLOCATED MULTI-BANKED MEMORY

FIELD OF THE INVENTION

This invention relates to texture mapping computer graphics systems and, more particularly, to methods and apparatus for storing graphics data, such as texture map data, in a linearly allocated memory.

BACKGROUND OF THE INVENTION

Computer graphics systems are used for displaying graphical representations of objects on a two-dimensional display screen. In a typical computer graphics system, an object to be represented on the display screen is broken down into multiple graphics primitives. Primitives are basic components of a graphics image and may include points, lines, vectors and polygons, such as triangles. Typically, a hardware/software scheme is implemented to render, or draw, on the two-dimensional display screen, the graphics primitives that represent a view of one or more objects being represented on the screen.

Typically, the primitives that define the three-dimensional object to be rendered are provided from a host computer, which defines each primitive in terms of primitive data. For example, when the primitive is a triangle, the host computer may define the primitive in terms of the X,Y,Z coordinates of its vertices, as well as the R,G,B color values of each vertex. Rendering hardware interpolates the primitive data to compute the display screen pixels that represent each primitive, and the R,G,B values for each pixel.

Texture mapping is commonly used in computer graphics systems to provide improved surface detail. Texture mapping involves mapping a source image, referred to as a texture, onto a surface of a three-dimensional object, and thereafter mapping the textured three-dimensional object to the two-dimensional display screen. Texture mapping involves applying one or more point elements (texels) of a texture to each point element (pixel) of the displayed portion of the object to which the texture is being mapped. Texture mapping hardware is conventionally provided with information indicating the manner in which the texels in a texture map correspond to the pixels on the display screen that represent the object. Each texel in a texture map is defined by S and T coordinates which identify its location in the two-dimensional texture map. In the case of a three-dimensional texture map, each texel is defined by S, T and R coordinates. For each pixel, the corresponding texel or texels that map to it are accessed from the texture map and are incorporated into the final R,G,B values generated for the pixel to represent the textured object on the display screen.

Each pixel in an object primitive may not map in a one-to-one correspondence with a single texel in the texture map. Depending on the size of the object on the display screen and the size of the texture map, a single pixel may map to multiple texels, or a single texel may map to multiple pixels. To facilitate texture mapping, a series of MIP maps may be created for each texture. A series of MIP maps includes a base map that corresponds directly to the texture map and a series of filtered maps, wherein each successive map is reduced in size by a factor of two in each of the two texture map dimensions. The series of texture MIP maps associated with the object being rendered is stored in a local memory accessible by the texture mapping hardware.

The texture mapping hardware can access texture data from any of the series of MIP maps. The determination of which map to access to provide the texel data for any particular pixel is based on the number of texels to which the pixel maps. If the pixel maps in one-to-one correspondence with a single texel in the texture map, then the base map is accessed. However, if the pixel maps to 4, 16 or 64 texels, then different level maps in the series of maps are accessed because those maps store texel data representing an average of 4, 16 and 64 texels in the texture map.

A pixel may not map directly to any one texel in the selected map and may fall between two or more texels in a single map or may fall between two maps. In this case, interpolation is utilized to accurately produce texel data. The texel data corresponding to a pixel can be a weighted average of four texel entries in a single map or a weighted average of eight texels in the two closest maps.

It is generally understood that there is two-dimensional locality in graphics rendering. That is, when a pixel is rendered, it is likely that the next pixel rendered will be near that pixel in X and/or Y. High performance requires that the hardware be designed to take advantage of this locality. In particular, the rendering of each pixel requires one or more memory locations to be accessed. The required image data or texture data may be stored in a frame buffer memory. In accessing the required data, there are different memory latencies for different address combinations within the memory. In general, it is faster to access another word which is located in the same "page" of memory than to access a word in a different page. This is because changing from one page to another requires closing the first page and opening the second, while accessing two data words in the same page does not carry this overhead. A typical memory may have two or four banks. Each bank is subdivided into a number of pages. In general, the best performance is obtained by accessing either the same page within any given bank or accessing a different bank. Consecutively accessing the same bank but a different page within that bank causes a large performance penalty.

For the reasons described above, rendering performance is affected by the way in which image data and texture data are stored in memory. One technique for MIP map texture storage which utilizes fixed, rectangular memory buffers is disclosed in U.S. Pat. No. 5,801,708 issued Sep. 1, 1998 to Alcorn et al. The disclosed technique is compatible with host computers which utilize Unix and X-windows operating systems. However, personal computers (PCs) typically employ a linear memory allocation scheme. The linear memory allocation scheme subdivides memory into blocks and then allocates a number of consecutive blocks for a given use. In a graphics system, a linear memory allocation scheme is convenient to allow flexible utilization of the memory, rather than dedicating memory to specific uses. However, a purely linear memory allocation scheme does not provide optimum rendering performance.

A modification of the linear memory allocation scheme, known as pseudo-linear frame buffer mapping, strikes a compromise between PC requirements for a linear, completely configurable frame buffer and the advantages of rectangular pages. Rather than treating the frame buffer as a linear array of words, this method treats the frame buffer as a linear array of blocks. Each block is a small two-dimensional array of memory, which is designed to provide optimized access when rendering with two-dimensional locality. A range of blocks can be allocated as a group and given a block stride to provide a larger two-dimensional area. The block stride establishes the X dimension of the image area or texture map in units of blocks.

Notwithstanding the advantages of the pseudo-linear frame buffer mapping technique, application of this technique to storage of a series of MIP maps does not provide optimum rendering performance. Accordingly, there is a need for improved methods and apparatus for texture map storage in a linearly allocated memory.

SUMMARY OF THE INVENTION

According to a first aspect of the invention, a method is provided for allocating correlated data sets to memory in a computer graphics system. The method comprises the steps of dividing each of the correlated data sets into blocks of data, the correlated data sets including at least first and second data sets, defining at least first and second subsets of each of the data sets, wherein the first subsets are correlated and the second subsets are correlated, and defining at least first and second areas of the memory. Blocks of data from the first subset of the first data set and the second subset of the second data set are stored in the first memory area. Blocks of data from the second subset of the first data set and the first subset of the second data set are stored in the second memory area. The blocks of data representing each data set are stored in consecutive blocks of the memory.

In one embodiment, the correlated data sets comprise a series of texture maps. In another embodiment, the correlated data sets comprise an image data set and a Z-data set.

According to another aspect of the invention, a method is provided for allocating texture data among first and second separately accessible areas of memory in a texture mapping computer graphics system. The method comprises the steps of dividing each texture map in a series of texture maps into a set of blocks of data, the series of texture maps including odd level texture maps and even level texture maps, defining first and second map areas of each texture map that has a width greater than one block, storing blocks of data from the first map areas of the odd level texture maps in the first memory area, storing blocks of data from the second map areas of the even level texture maps in the first memory area, storing blocks of data from the second map areas of the odd level texture maps in the second memory area, and storing blocks of data from the first map areas of the even level texture maps in the second memory area. The blocks of data representing each texture map in the series of texture maps are stored in consecutive blocks of memory.

Each of the steps of storing blocks of data may comprise allocating each of the blocks of data to two different memory banks. The step of allocating of each of the blocks of data to two different memory banks may comprise reversing the allocation of blocks of data to different memory banks in successive pages of the memory when one half of a row of blocks in a texture map is allocated to more than one page of the memory.

In one embodiment, each page in the memory includes eight blocks of data, and each page is divided between the first memory area and the second memory area. The step of defining first and second map areas may comprise dividing each texture map into left and right areas of equal size. The allocation of the left and right areas to the first and second memory areas is reversed in successive texture maps in the series of texture maps.

According to another aspect of the invention, apparatus is provided for allocating texture data among first and second separately accessible areas of memory in a texture mapping computer graphics system. The apparatus comprises means for dividing each texture map in a series of texture maps into a set of blocks of data, the series of texture maps including odd level texture maps and even level texture maps, means for defining first and second map areas of each texture map that has a width greater than one block, first means for storing blocks of data from the first map areas of the odd level texture maps in the first memory area, second means for storing blocks of data from the second map areas of the even level texture maps in the first memory area, third means for storing blocks of data from the second map areas of the odd level texture maps in the second memory area, and fourth means for storing blocks of data from the first map areas of the even level texture maps in the second memory area. The blocks of data representing each texture map in the series of texture maps are stored in consecutive blocks of memory.

BRIEF DESCRIPTION OF THE DRAWINGS

For a better understanding of the present invention, reference is made to the accompanying drawings, which are incorporated herein by reference and in which:

FIGS. 5A–5E are schematic illustrations of the mapping of image data to memory for block strides of 1, 2, 4, 8, and 16, respectively;

FIGS. 6A–6F are schematic illustrations of the mapping of texture map data to memory for block strides of 1, 2, 4, 8,16, and 32, respectively;

DETAILED DESCRIPTION

Figure 1:
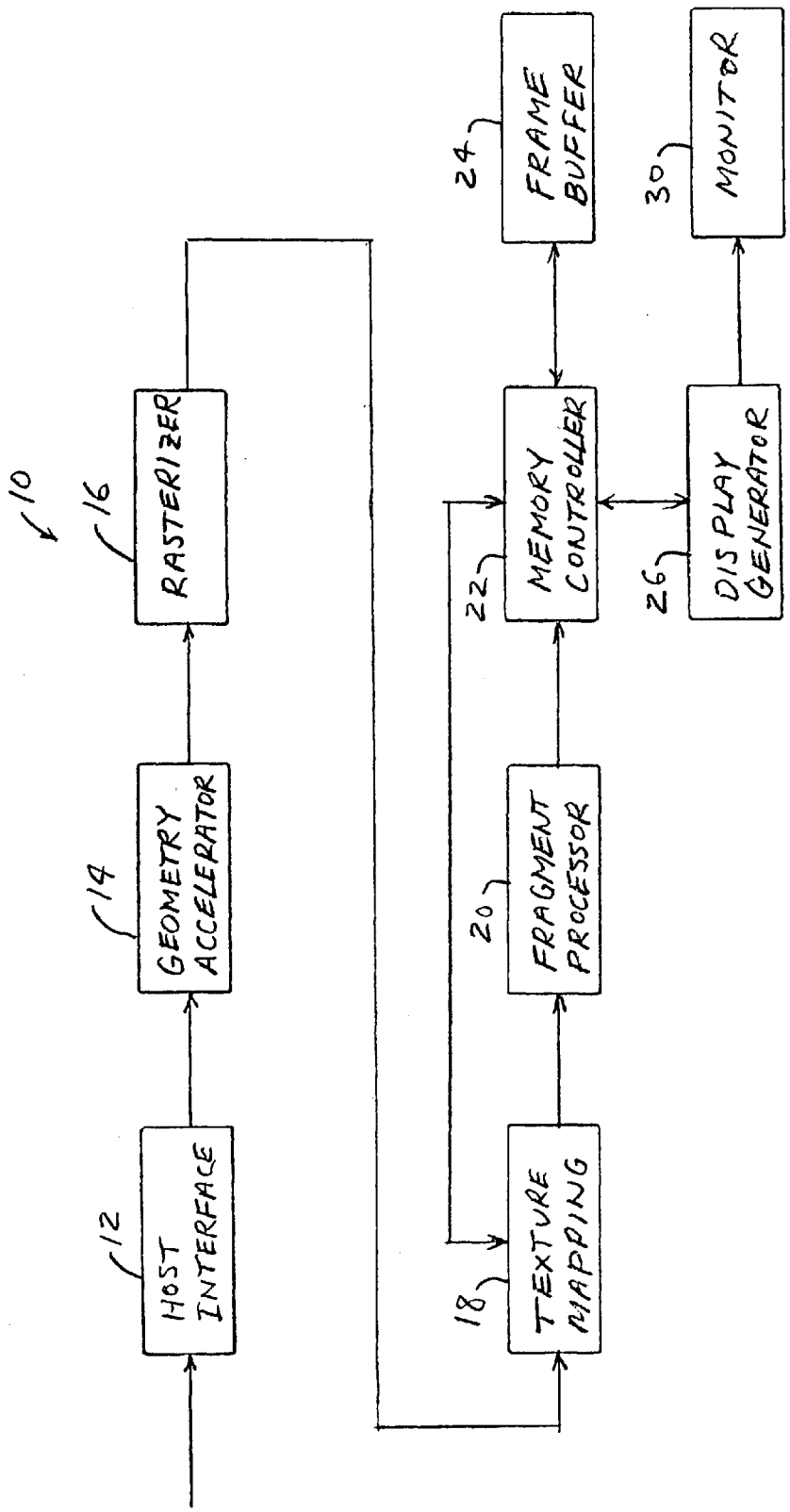
FIG. 1 is a block diagram of one embodiment of a computer graphics system.

A simplified block diagram of one embodiment of a computer graphics system 10 is shown in FIG. 1. The system 10 as shown includes a host interface 12, a geometry accelerator 14, a rasterizer 16, a texture mapping unit 18, a fragment processor 20, a memory controller 22, a memory in the form of a frame buffer 24 and a display generator 26. The system outputs pixel data for controlling the pixels of a monitor 30.

The host interface 12 communicates with a host computer (not shown) and receives data representing primitives to be rendered from the host computer. The primitives are specified by X, Y, Z vector coordinate data, R, G, B color data and S, T texture coordinates for portions of the primitives, such as the vertices of a triangle.

The geometry accelerator 14 transforms the X, Y, Z coordinates that define the primitives into corresponding screen space coordinates, determines object R, G, B color values and texture S, T values for the screen space coordinates, decomposes primitive quadrilaterals into triangles and computes a triangle plane equation to define each triangle.

The rasterizer 16 interpolates the rendering parameters generated by the geometry accelerator 14 to determine X and Y coordinates and color values for each pixel of each triangle. The rasterizer 16 interpolates the X, Y pixel coordinates and interpolates S and T coordinates that correspond to each X, Y screen display pixel that represents a primitive. In the rasterization process, the edges of the triangle are determined, and then the pixels along each edge are determined, for example by interpolating between the vertex information. Then the pixels along each span line between the edges are determined by interpolation of the edge information.

For each pixel, the texture mapping unit 18 accesses portions of one or more texture MIP maps in frame buffer 24 that correspond to the pixel and computes resultant texture data for the pixel. The resultant texture data may include a weighted average of multiple texels.

The fragment processor 20 performs per pixel operations on the output data from the rasterizer 16 and the texture mapping unit 18. The fragment processor may perform operations such as window clipping, color keying, texture application and fog application.

The memory controller 22 controls frame buffer 24. In the embodiment of FIG. 1, frame buffer 24 is used for storage of image data and texture mapping data.

Display generator 26 accesses the final image data in frame buffer 24 through memory controller 22. The display generator 26 generates the color values for each pixel to be displayed on monitor 30.

Figure 2:
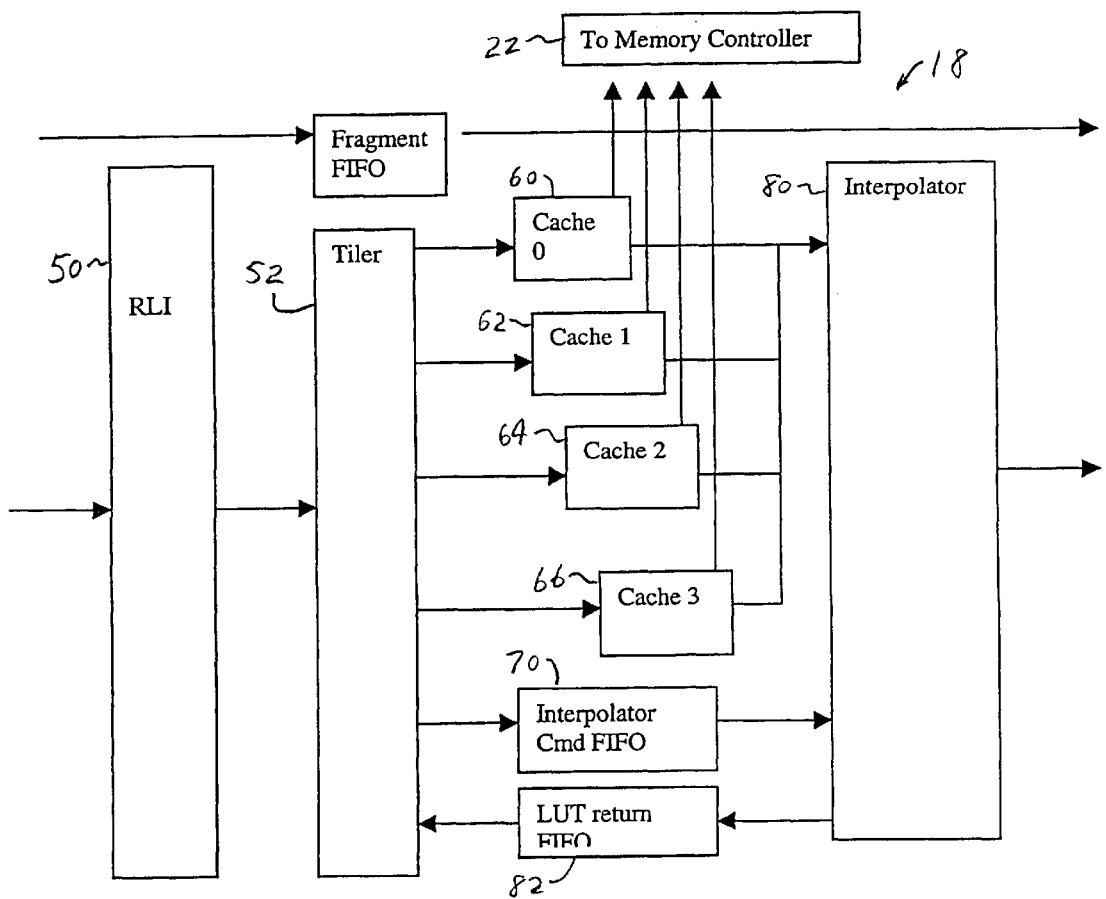
FIG. 2 is a block diagram of an embodiment of the texture mapping block of FIG. 1.

A simplified block diagram of texture mapping unit 18 is shown in FIG. 2. Pixel data is received from rasterizer 16 by a rasterizer interface 50 and is supplied to a tiler 52. The output of tiler 52 is supplied to cache memories 60, 62, 64 and 66, and to an interpolator command FIFO 70. The outputs of cache memories 60, 62, 64 and 66 are supplied to an interpolator 80 and to memory controller 22. A lookup table (LUT) return FIFO 82 is coupled between interpolator 80 and tiler 52. The tiler 52 includes a memory mapping unit for allocation of texture maps to frame buffer 24, as described in detail below.

The function of the texture mapping unit 18 is to map a texture onto the surface of an object, where the object is represented by an array of pixels. As discussed above, the texture may not map directly to the pixels and usually requires interpolation. In particular, a pixel may fall between two or more texels in a single texture map. In this case the texture data corresponding to a pixel may be the weighted average of four texels in a single texture map. Furthermore, pixels may fall between two texture maps. In this case, the texture mapping unit 18 may interpolate between the two closest MIP maps to determine the resultant texture data for a pixel. Thus, the resultant texture data for one pixel may be a weighted average of as many as eight texels, i.e., the four closest texels in each of the two closest texture maps. In another mode, the texture data for a single pixel may be calculated as the weighted average of 16 texels, i.e., the eight closest texels in each of the two closest texture maps.

The interpolations involved in texture mapping are repeated for each pixel of each object having a texture. Thus, if the calculations are performed inefficiently, the performance of the graphics system is adversely affected. In order to perform the interpolations involved in texture mapping, the required texels must be accessed in frame buffer 24. It is well known that memory latency can have a major impact on system performance, particularly where the calculations that suffer from memory latency are repeated many times.

As described above, there are different memory latencies for different address combinations. It is faster to access consecutive words located on the same page of memory than to access words on different pages. Therefore, it is desirable to store texture maps in memory in a manner that is designed to minimize page changes as the texture mapping calculations are performed for an object. The manner in which texture maps are stored in memory is constrained by the linear allocation scheme described above.

In one embodiment, frame buffer 24 includes eight SDRAM memory chips divided into four interleaves, with two SDRAM chips in each interleave. Four separate memory controllers are provided, with one corresponding to each interleave, so that the SDRAM chips within each interleave can be accessed simultaneously. Each SDRAM chip includes four distinct banks of memory in which different pages of memory can be accessed in consecutive read cycles without incurring repaging penalties. In this example, each SDRAM chip has a capacity of 8 megabytes for a total capacity of 64 megabytes. Each bank in the SDRAM chip contains 4,096 pages of 512 bytes per page.

As described above, pseudo-linear frame buffer mapping treats the frame buffer 24 as a linear array of blocks. Each block is a two-dimensional array of memory which is selected to provide optimized access when rendering with two-dimensional locality. For the memory configuration described above, the block size is 2,048 bytes, arranged as 64 bytes wide by 32 pixels in height. Each block directly maps to portions of two banks in the SDRAM chips. A total of four blocks is needed to completely use up a page in two banks of memory. Eight blocks are needed to use up a page in all four banks of memory.

Pseudo-linear frame buffer mapping involves the mapping of an array of data, such as an array of pixel data representing an image or an array of texel data representing a texture, to block coordinates, followed by memory mapping of the block coordinates to specific rows, banks and pages in the frame buffer 24. An array of data to be mapped to memory may be characterized by a block number offset (BNO), which is the number of the first memory block of the array and a block stride (BS), which is the number of sequential blocks in one row of blocks. Thus, for example, an array having a block stride of four and containing a total of sixteen blocks represents a 4×4 array of blocks. The blocks in the array are mapped to memory as described below. The location of the array of blocks in memory is represented by the block number offset.

An example of mapping blocks of data to memory banks and pages for a frame buffer configured as described above is illustrated in FIG. 3. Each block has a size of 64 bytes wide by 32 pixels in height. Each block is divided between two memory banks. Thus, each of blocks 0–3 is divided between bank 0 and bank 1, and each of blocks 4–7 is divided between bank 2 and bank 3. Blocks 0–7 use up one page of 32 rows in banks 0–3.

Figure 4:
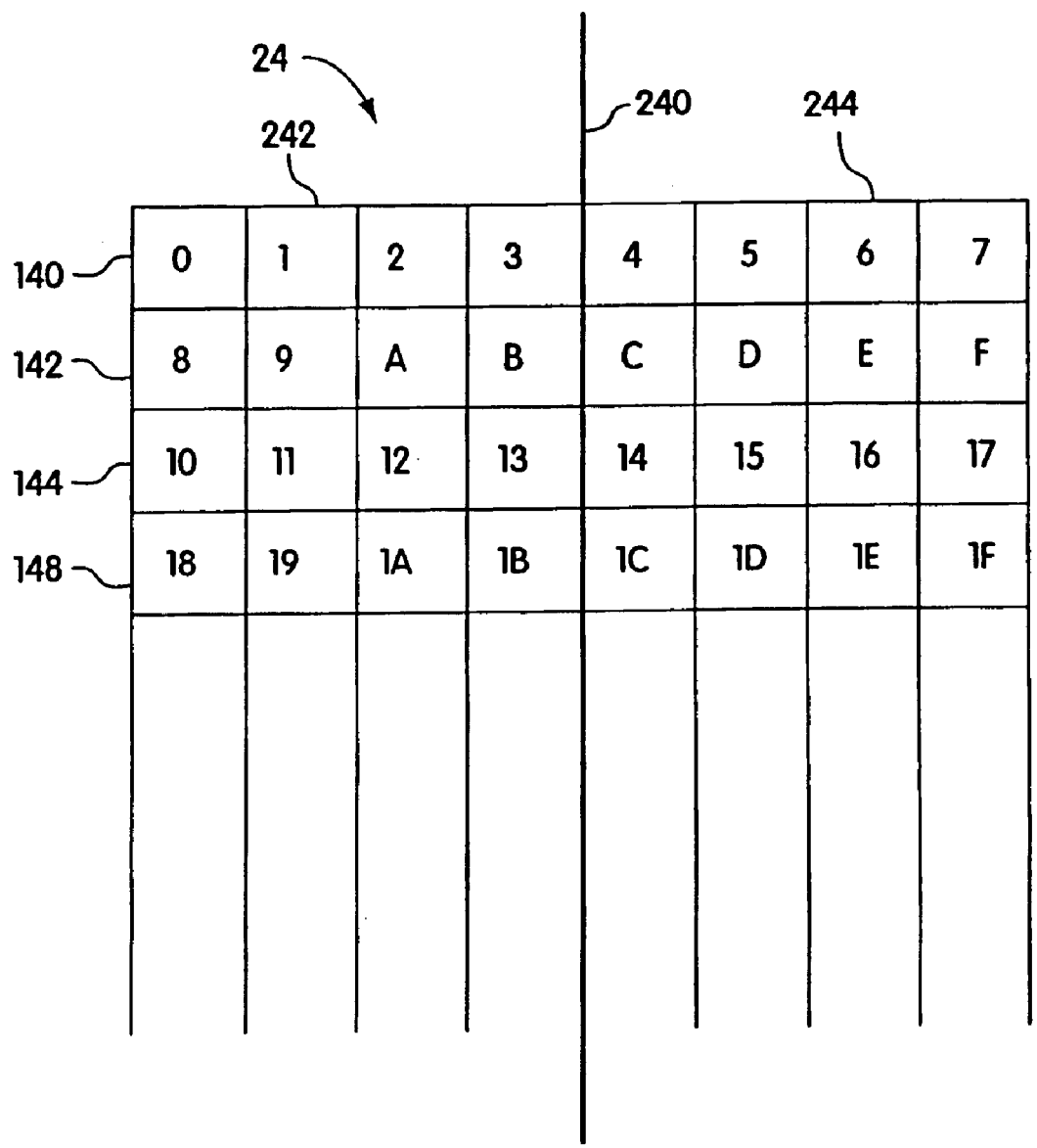
FIG. 4 is a schematic illustration of an example of a memory organization.

The mapping of blocks of data in frame buffer 24 is further illustrated in FIG. 4. Four memory pages 140, 142, 144 and 148 are illustrated. Each page contains eight blocks of data. Thus, for example, page 140 contains blocks 0–7, page 142 contains blocks 8–F, etc. It will be understood that the memory organization shown in FIG. 4 continues through frame buffer 24.

The mapping of an array of data to block coordinates is performed by different elements of the graphics system of FIG. 1, depending on the data type. For example, texture data is mapped to block coordinates by the texture mapping unit 18, and more particularly, by the tiler 52 shown in FIG. 2. Image data is mapped to block coordinates by rasterizer 16. The block coordinates are mapped to frame buffer 24 by memory controller 22.

The mapping of image data arrays of different sizes to frame buffer 24 using pseudo-linear frame buffer mapping is illustrated in FIGS. 5A–5E. An image data array 160 having a block stride of one is illustrated in FIG. 5A; an image data array 162 having a block stride of two is illustrated in FIG. 5B; an image data array 164 having a block stride of four is illustrated in FIG. 5C; an image data array 166 having a block stride of eight is illustrated in FIG. 5D; and an image data array 168 having a block stride of sixteen is illustrated in FIG. 5E. The allocation of blocks for each image data array in the frame buffer 24 is illustrated. It may be observed that the blocks of data for each image data array are allocated to consecutive blocks in memory. Thus, for example with reference to FIG. 5C, a first row of blocks of image data array 164 is allocated to blocks 0–3, a second row of blocks is allocated to blocks 4–7, a third row of blocks is allocated to blocks 8–B of frame buffer 24, etc. A hexadecimal block numbering scheme is used. Thus, each row of blocks of image data array 164 occupies consecutive blocks in one half page in frame buffer 24. Referring to FIG. 5E, a first row of image data array 168 having sixteen blocks is allocated to blocks 0–F in frame buffer 24 and thus occupies consecutive blocks in two pages of frame buffer 24. In each case, data from blocks in image data arrays 160, 162, 164, 166 and 168 is stored in consecutive blocks of frame buffer 24.

The technique for mapping of image data arrays to frame buffer 24 as illustrated in FIGS. 5A–5E permits efficient rendering of image data. As noted above, consecutively accessing different pages within one bank causes a large performance penalty. However, this performance penalty is avoided in the allocation technique illustrated in FIGS. 5A–5E. Consider, for example, pixels rendered along a line 180 in image data array 164 shown in FIG. 5C. Data array 164 includes rows 182, 184, 186, 188, etc. of blocks. It may be observed that rows 182 and 184 map to page 140 in frame buffer 24, and rows 186 and 188 map to page 142 in frame buffer 24 (see FIG. 4). Furthermore, row 182 of blocks of image data array 164 maps to banks 0 and 1, row 184 of blocks maps to banks 2 and 3, and row 186 of blocks maps to banks 0 and 1 (see FIGS. 3 and 4). Thus, rendering pixels along line 180 in either direction avoids consecutively accessing different pages within the same bank. A similar analysis may be applied to the image data arrays shown in FIGS. 5A, 5B, 5D and 5E.

As described above, texture mapping involves storage of a series of texture MIP maps. Each map in a series of MIP maps is reduced in size by a factor of two in each of the two texture map dimensions as compared with the previous map in the series. The series of texture MIP maps needed for a texture mapping operation is stored in frame buffer 24 for access by texture mapping unit 18. As further described above, the texture mapping unit 18 may interpolate between texels in a single texture map or may interpolate between the two closest texture maps to a pixel to determine the resultant texture data for the pixel.

Figures 6A, 6B, 6C:
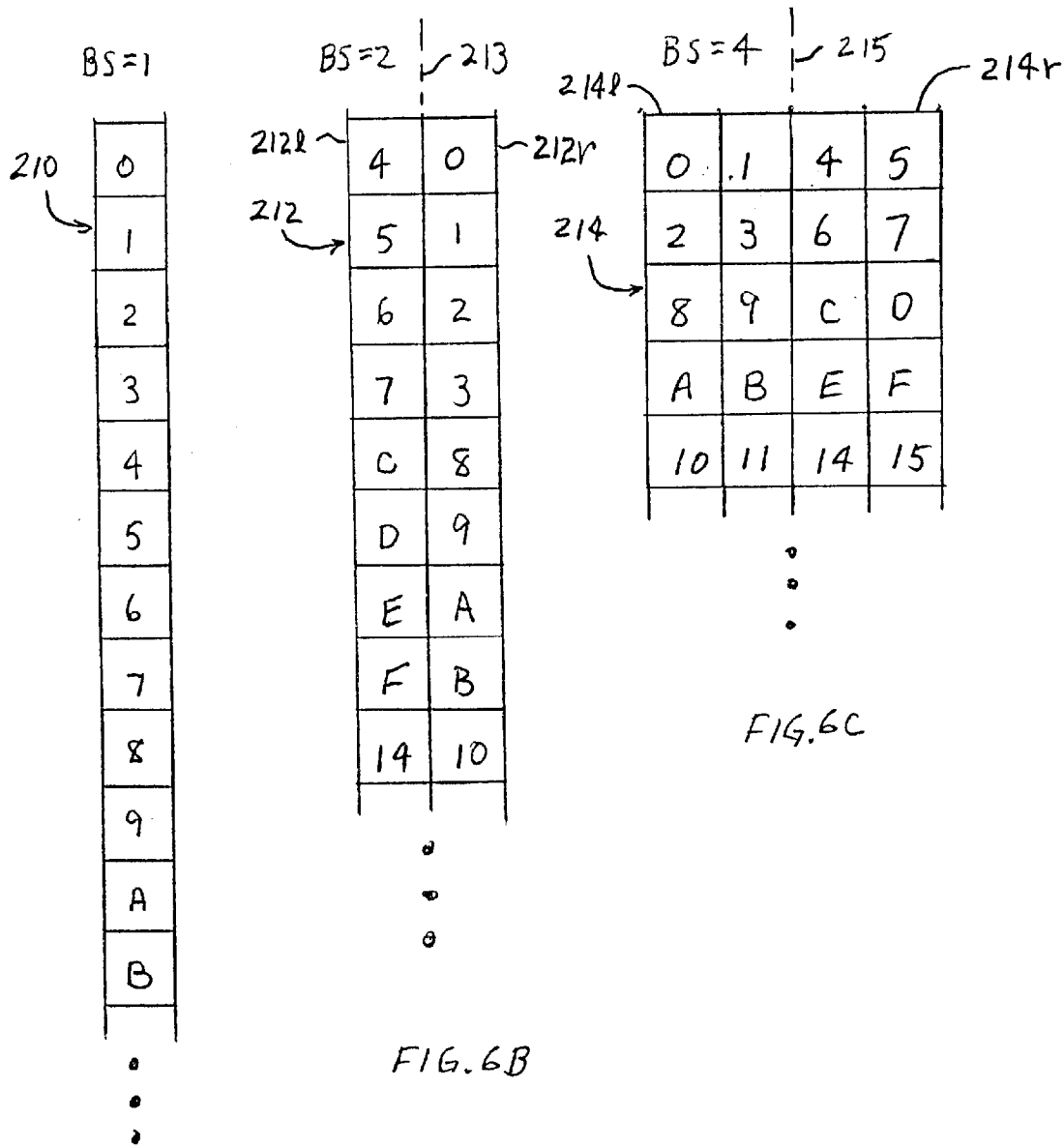
Figure 6F:
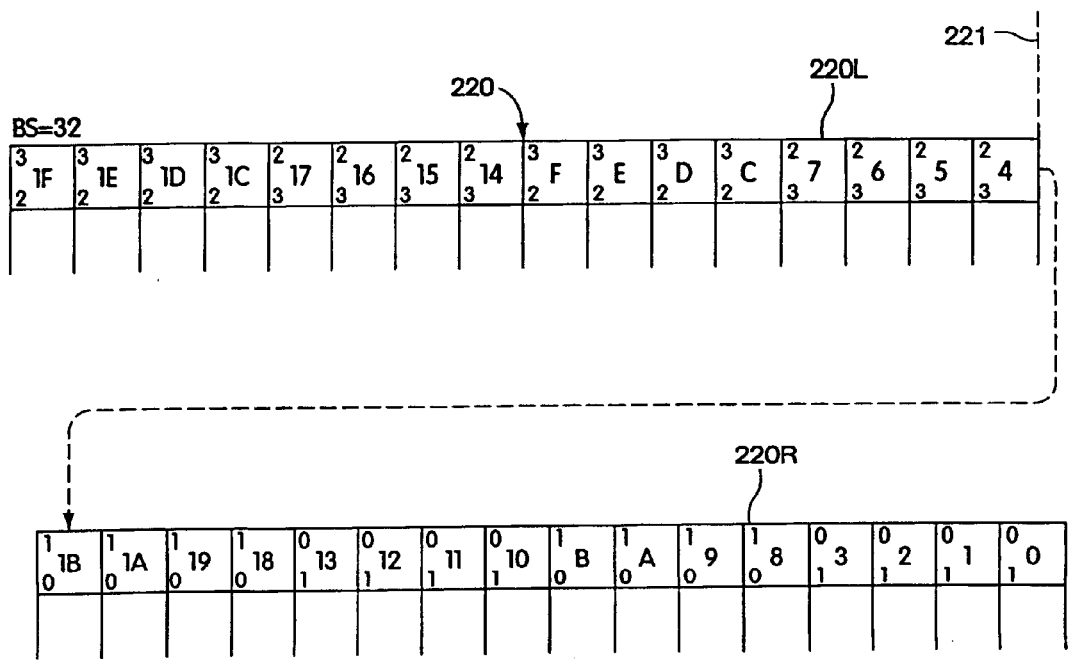
Figure 7A:
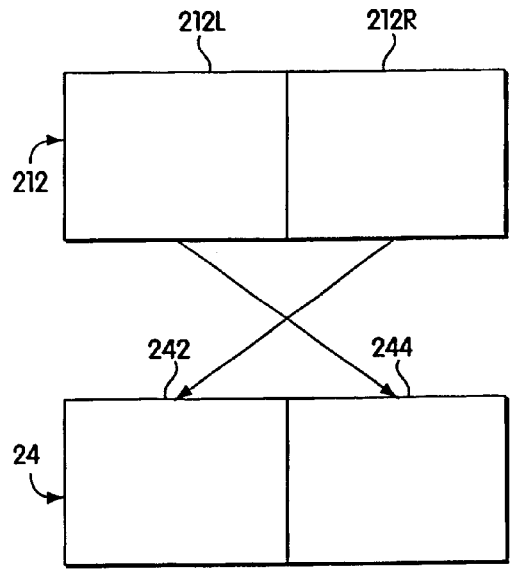
Figure 7B:
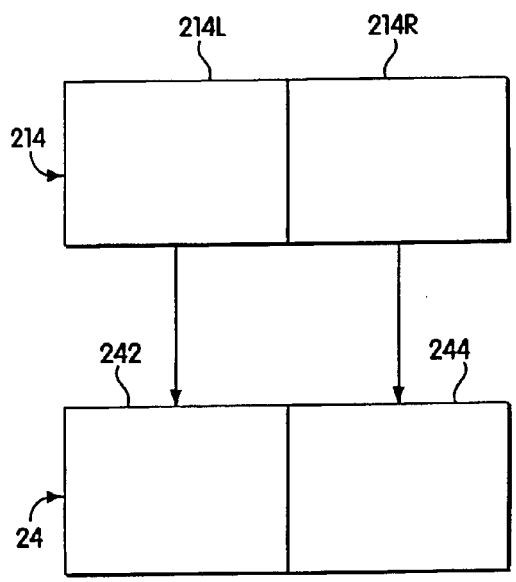
Figure 7C:
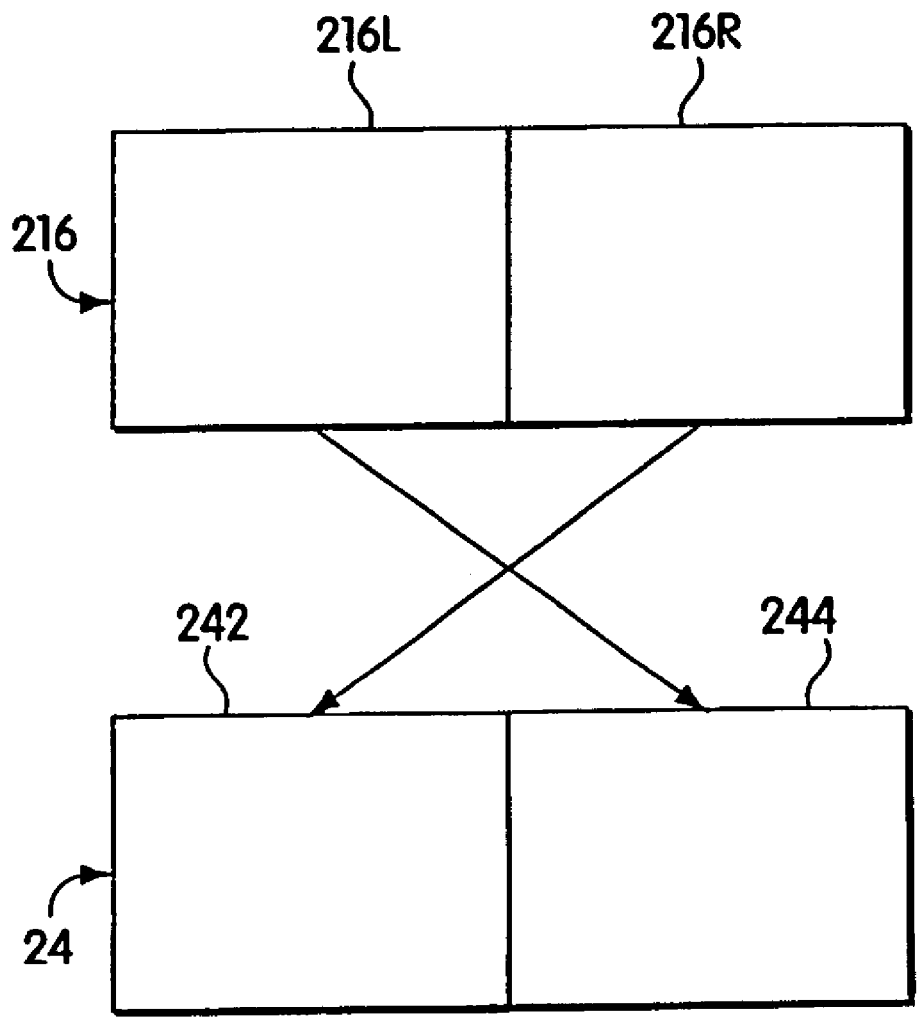
Figure 8A:
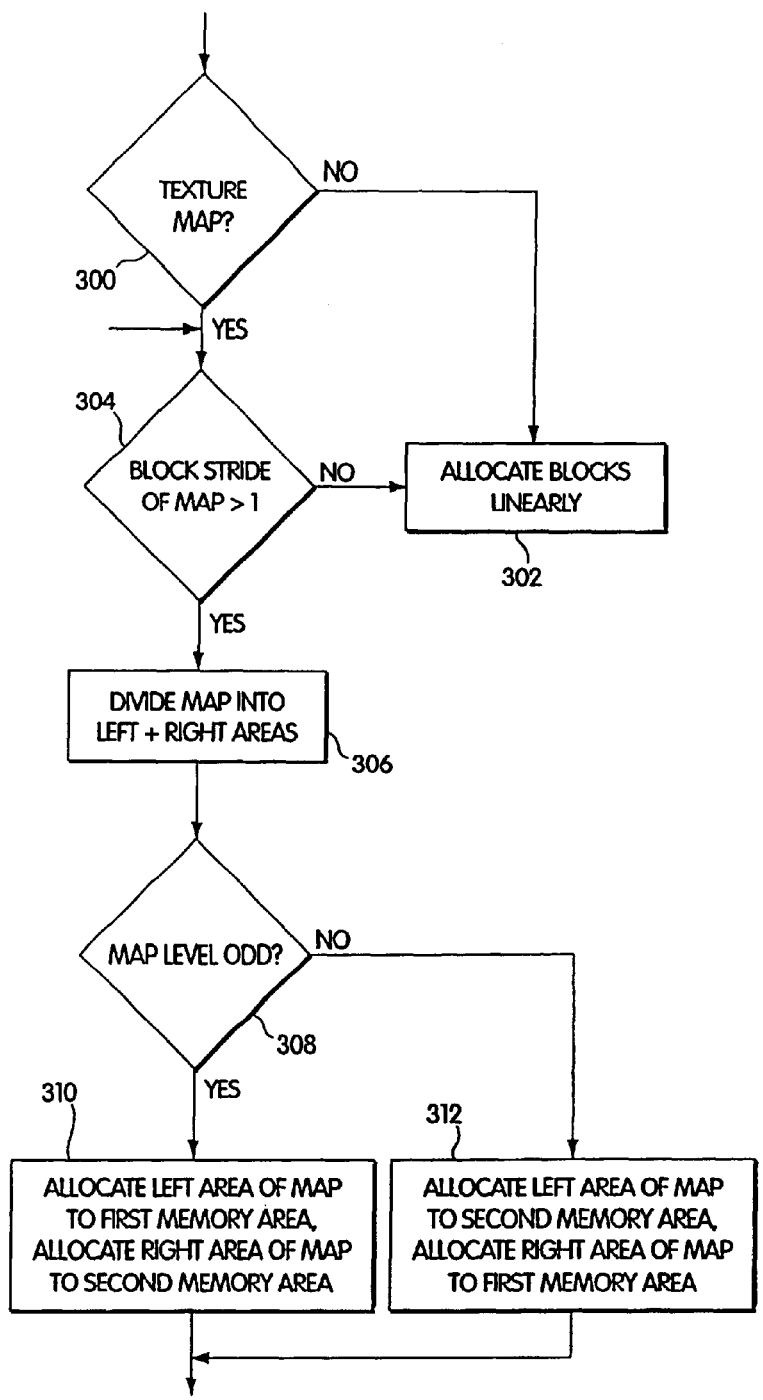
Figure 8B:
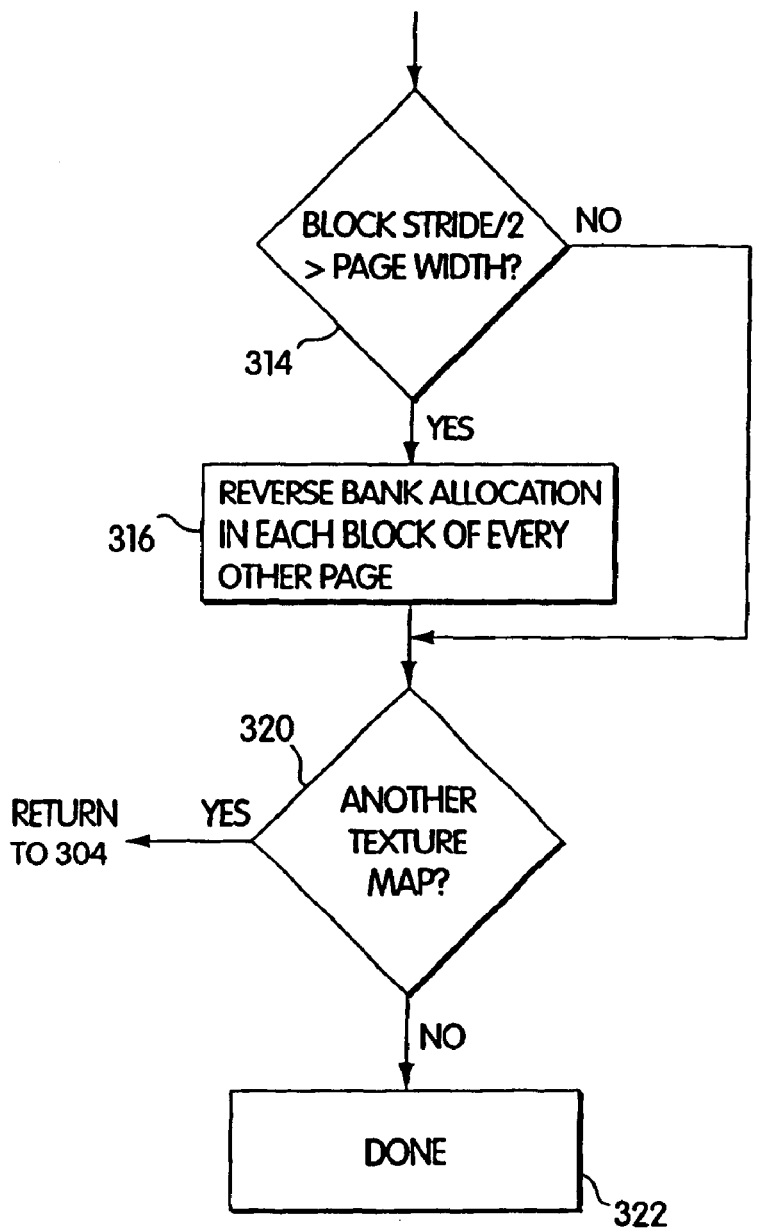
Figures 6D, 6E:
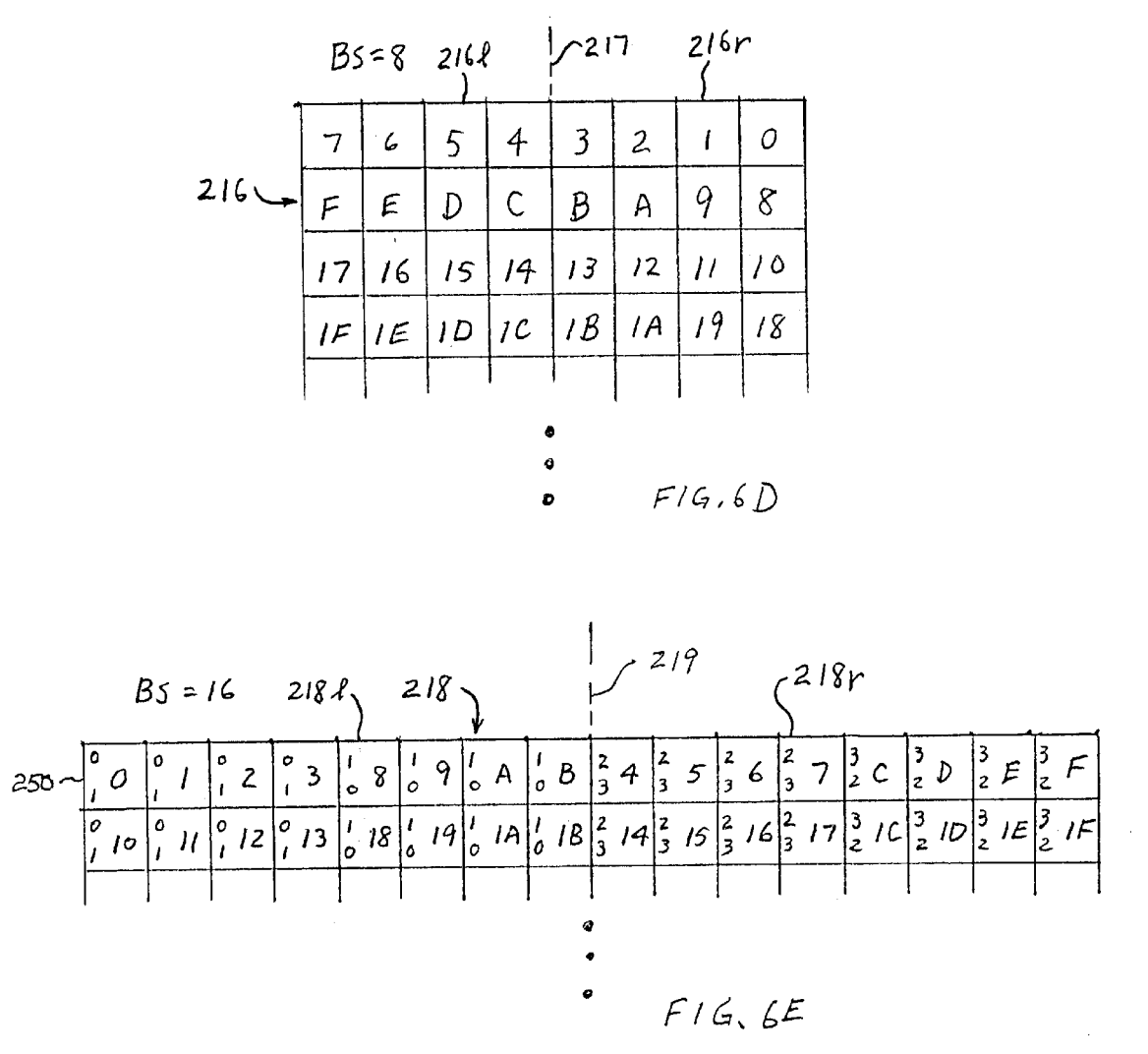

In order to avoid the performance penalties involved with consecutively accessing different pages within one bank of memory during the texture mapping calculations, the texture maps may be stored in frame buffer 24 as illustrated in FIGS. 6A–6F. A texture map 210 having a block stride of one is shown in FIG. 6A; a texture map 212 having a block stride of two is shown in FIG. 6B; a texture map 214 having a block stride of four is shown in FIG. 6C; a texture map 216 having a block stride of eight is shown in FIG. 6D; a texture map 218 having a block stride of sixteen is shown in FIG. 6E; and a texture map 220 having a block stride of thirty-two is shown in FIG. 6F.

The texture maps shown in FIGS. 6A–6F are allocated to frame buffer 24 so as to avoid the paging performance penalty described above. In particular, each texture map having a block stride greater than one is divided into two areas. In the example of FIGS. 6A–6F, each texture map except texture map 210 in FIG. 6A is divided into a left area and a right area. Thus, for example, texture map 212 is divided along a line 213 into a left area 212*l* and a right area 212*r*. Similarly, texture map 214 is divided along a line 215 into a left area 214*l* and right area 214*r*; texture map 216 is divided along a line 217 into a left area 216*l* and a right area 216*r*; etc. Each row of blocks in each texture map is preferably equally divided between the left and right areas.

Referring again to FIG. 4, frame buffer 24 is divided into two areas and in particular is divided along a line 240 into a first area 242 and a second area 244. It may be observed, with reference to FIGS. 3 and 4, that first area 242 contains blocks allocated to banks 0 and 1 and that second area 244 contains blocks allocated to banks 2 and 3. Stated differently, each of pages 140, 142, 144, 148, etc. in frame buffer 24 is preferably divided in half, such that first area 242 contains banks 0 and 1, and second area 244 contains banks 2 and 3.

Referring again to FIGS. 6A–6F, the allocation of texture maps 210, 212, 214, 216, 218 and 220 to frame buffer 24 is described. Texture map 210, having a block stride of one, is simply stored in consecutive blocks in frame buffer 24. Texture map 212, having a block stride of two, is stored such that left area 212*l* is allocated to consecutive blocks 4, 5, 6, 7, C, D, etc. in second memory area 244 (FIG. 4); and right area 212*r* is allocated to consecutive blocks 0, 1, 2, 3, 8, 9, etc. in first memory area 242 (FIG. 4). Texture map 214, having a block stride of four, is stored in frame buffer 24 such that left area 214*l* is allocated to consecutive blocks 0, 1, 2, 3, 8, 9, etc. in first memory area 242; and right area 214*r* is allocated to consecutive blocks, 4, 5, 6, 7, C, D, etc. in second memory area 244. Texture map 216, having a block stride of eight, is stored in frame buffer 24 such that left area 216*l* is allocated to consecutive blocks in second memory area 244; and right area 216*r* is allocated to consecutive blocks in first memory area 242. Although the blocks are shown in FIG. 6D in reverse order in each row of texture map 216, reversal of the order of blocks is not required. As shown in FIG. 6E, texture map 218, having a block stride of sixteen, is stored in frame buffer 24 such that left area 218*l* is allocated to consecutive blocks in first memory area 242; and right area 218*r* is allocated to consecutive blocks in second memory area 244. As shown in FIG. 6F, texture map 220, having a block stride of thirty-two, is stored in frame buffer 24 such that left area 220*l* is allocated to consecutive blocks in second memory area 244; and right area 220*r* is allocated to consecutive blocks in first memory area 242. Again, the reversal of the order of blocks within each area of each row is optional. Texture maps having block strides larger than thirty-two may be utilized within the scope of the invention.

The texture maps 210, 212, 214, 216, 218 and 220 are shown in FIGS. 6A–6F as stored in the same area of frame buffer 24. In actual practice, it will be understood that each texture map will have a different block number offset, so that the different texture maps are stored in different, non-overlapping areas of frame buffer 24. Although the data within each texture map is stored in consecutive blocks in frame buffer 24, the texture maps in a series of MIP maps are not necessarily stored in consecutive blocks.

Figure 7A:
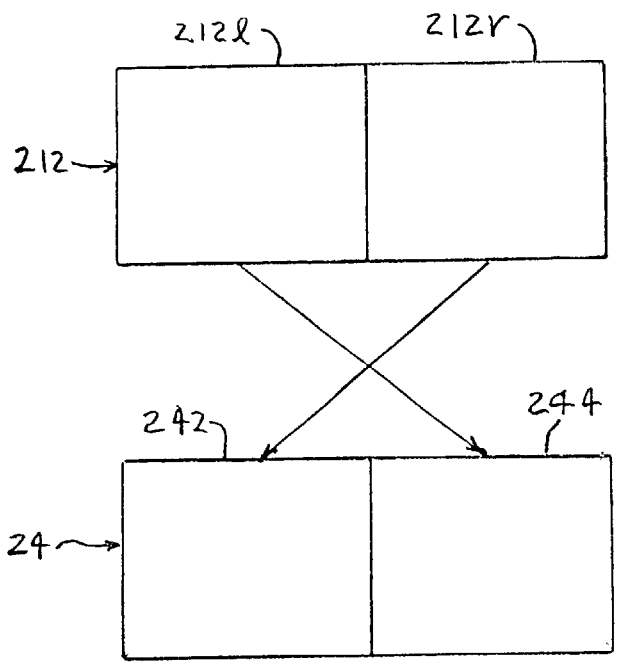
FIGS. 7A–7C are schematic illustrations of the alternating allocation of texture map data to memory.
Figure 7B:
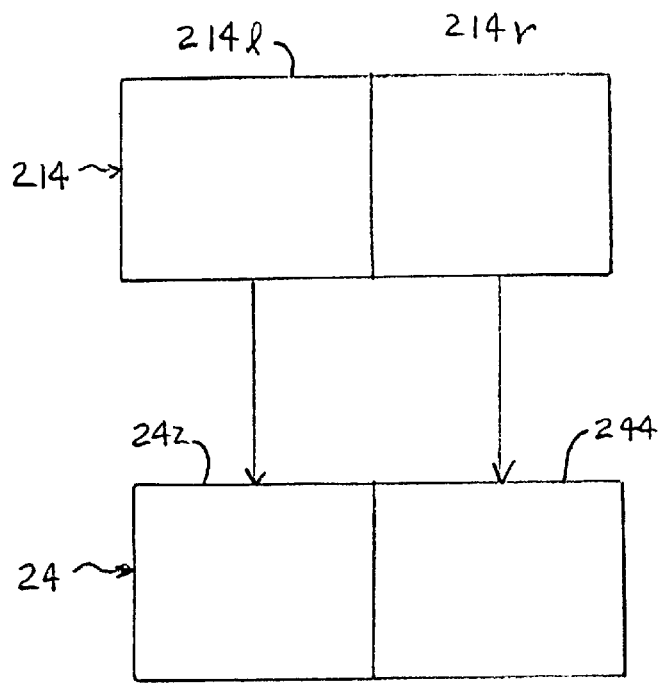
Figure 7C:
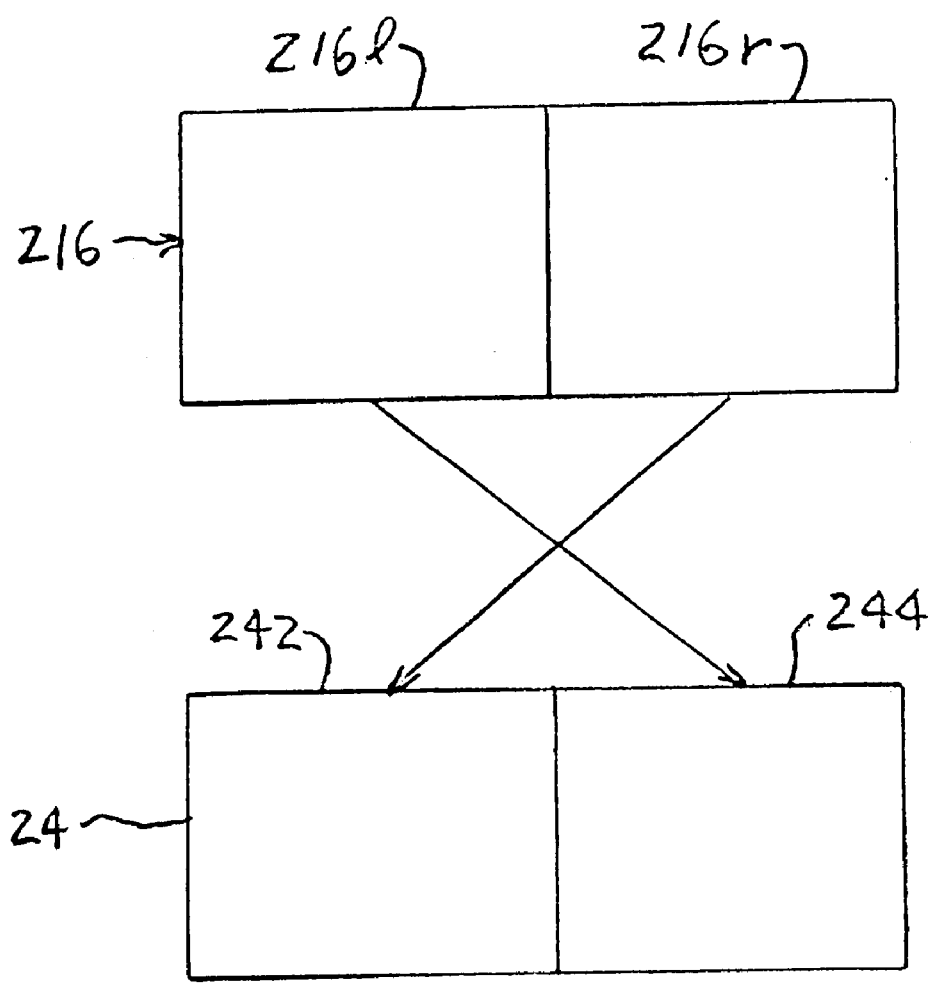

It may be observed that the left and right areas of successive texture maps, except for texture map 210 having a block stride of one, alternate with respect to their storage locations in first memory area 242 and second memory area 244. The alternating feature is illustrated in FIGS. 7A–7C.

As shown, left area 212*l* of texture map 212 is allocated to second memory area 244; left area 214*l* of texture map 214 is allocated to first memory area 242; left area 216*l* of texture map 216 is allocated to second memory area 244, etc., in an alternating pattern. Similarly, right area 212*r* of texture map 212 is allocated to first memory area 242; right area 214*r* of texture map 214 is allocated to second memory area 244; right area 216*r* of texture map 216 is allocated to first memory area 242, etc., in an alternating pattern. Thus, the allocation of the left and right areas of successive texture maps in a series of MIP maps to the first and second memory areas alternates. Stated differently, where the texture maps in a series are arbitrarily numbered, the left areas of odd level texture maps are allocated to the first memory area and the right areas of the odd level texture maps are allocated to the second memory area. The allocation is reversed in even level texture maps. This allocation approach ensures efficient performance during texture mapping.

As described above, texture mapping may involve interpolation of texture data from two adjacent texture maps. In that case, texture data is accessed in different memory pages, because the texture data for two texture maps is likely to be stored in different memory pages. However, the memory allocation technique described above ensures that consecutive memory accesses during interpolation of texture data from two texture maps are to different memory banks in different memory pages rather than the same memory bank in different memory pages. For example, assume that texture mapping of an object requires interpolation between texture data in texture map 214 and texture map 216. Further, assume that the pixels of the object map to left area 214*l* of texture map 214 and left area 216*l* of texture map 216. The texture mapping operation thus requires accessing texture data in first memory area 242, which includes banks 1 and 2, and accessing texture data in second memory area 244, which includes banks 3 and 4. The memory allocation scheme described above in connection with FIGS. 6A–6F therefore avoids consecutive accesses to different pages in the same bank. Instead, this memory allocation technique produces accesses to different pages in different banks and does not result in a large performance penalty.

Figure 3:
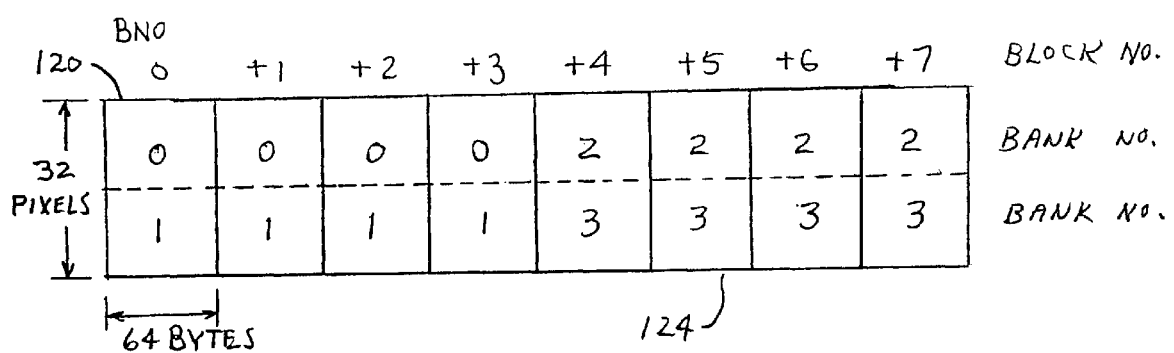
FIG. 3 is a schematic illustration of blocks of data mapped to memory banks in a angle memory page.

A further feature of the invention is described with reference to FIGS. 6E and 6F. For block strides greater than the number of blocks in a row of memory, in this example eight, it may be observed that each of the left and right areas of each row of the texture map is allocated to more than one memory page. For example, with reference to FIG. 6E, row 250 of left area 218*l* of texture map 218 is allocated to blocks 0, 1, 2, and 3 of page 140 and to blocks 8, 9, A and B of page 142 in frame buffer 24 (FIG. 4). In this case, if all bank allocations were made as shown in FIG. 3, a performance penalty would result on a transition between pages in a row of texture map 218. For example, a transition between block 3 and block 8 in row 250 would result in a page change within bank 0 or bank 1 and would cause a large performance penalty.

To avoid this performance penalty, the bank allocations are reversed in successive pages for the case where a texture map has more than one page in a row of the left area or the right area. Thus, referring again to FIG. 6E, the upper half of each of blocks 0, 1, 2 and 3 in memory page 140 is allocated to bank 0, and the lower half of each of blocks 0, 1, 2 and 3 is allocated to bank 1. However, the upper half of each of blocks 8, 9, A and B in the next memory page 142 following blocks 0, 1, 2 and 3 is allocated to bank 1, and the lower half of each of blocks 8, 9, A and B is allocated to bank 0. Similarly, the upper half of each of blocks 4, 5, 6 and 7 in memory page 140 is allocated to bank 2, and the lower half of each of blocks 4, 5, 6 and 7 is allocated to bank 3. In the next memory page 142, the upper half of each of blocks C, D, E and F is allocated to bank 3, and the lower half of each of blocks C, D, E and F is allocated to bank 2. Thus, in traversing from block 3 to block 8 in texture map 218, page and bank changes occur, and the performance penalty is avoided. Similarly, in traversing from block 7 to block C in texture map 218, page and bank changes occur. It may be observed that the bank allocation on successive pages is reversed in any texture map wherein the left area or the right area contains portions of more than one memory page. Stated differently, the bank allocation is reversed in successive memory pages if the block stride divided by two is greater than the memory page width.

Figure 8A:
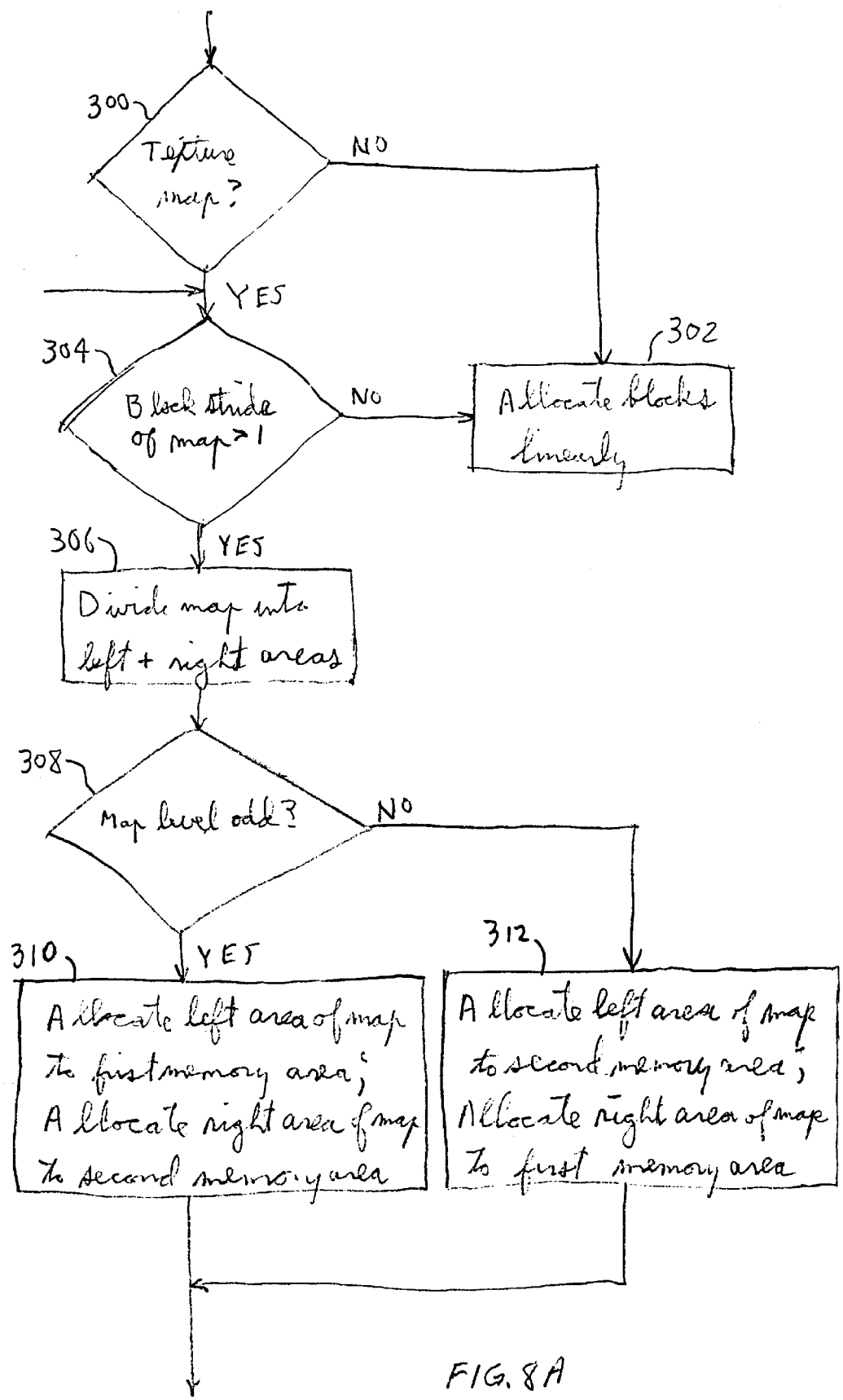
FIGS. 8A and 8B show a flow chart of an example of a process for storage of texture map data in accordance with the invention.
Figure 8B:
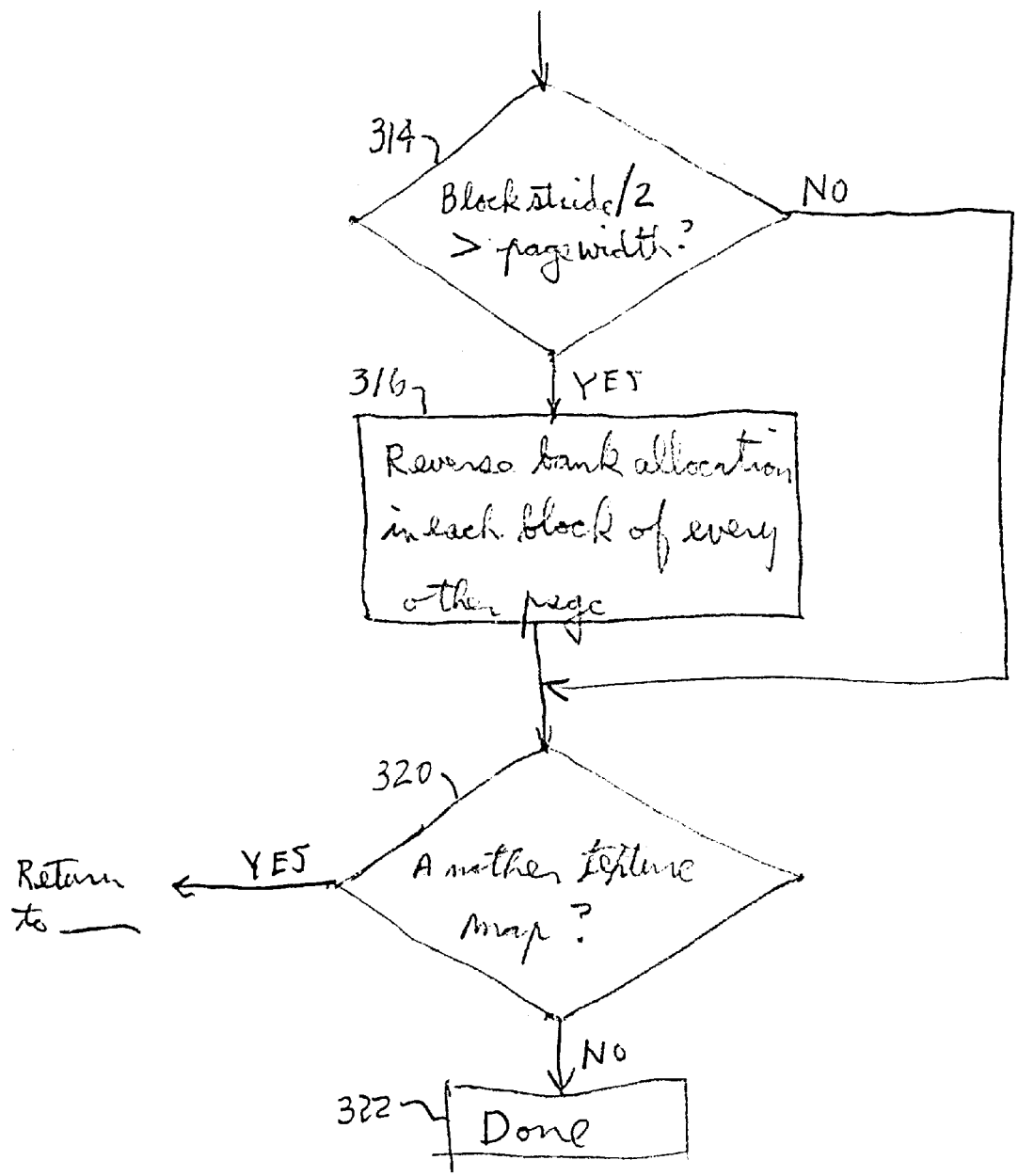
Figure 1:
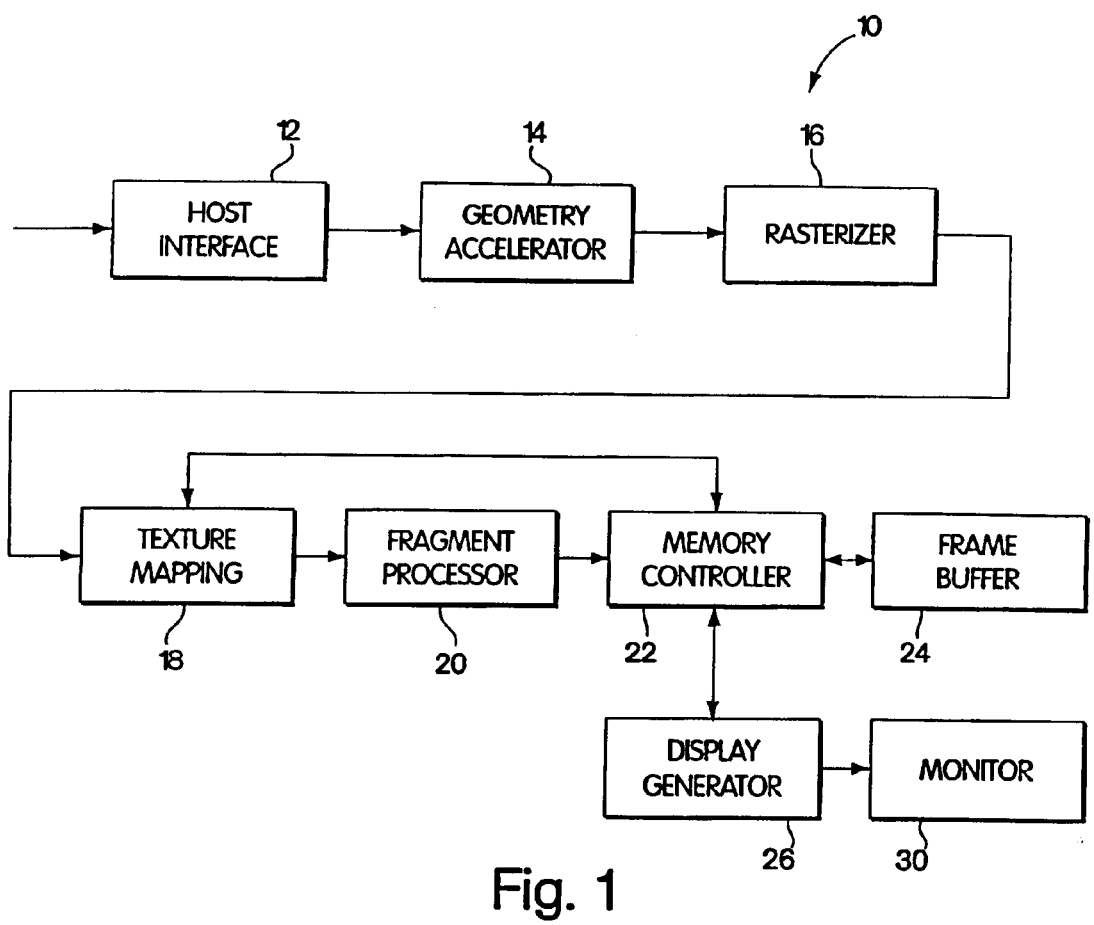
Figure 2:
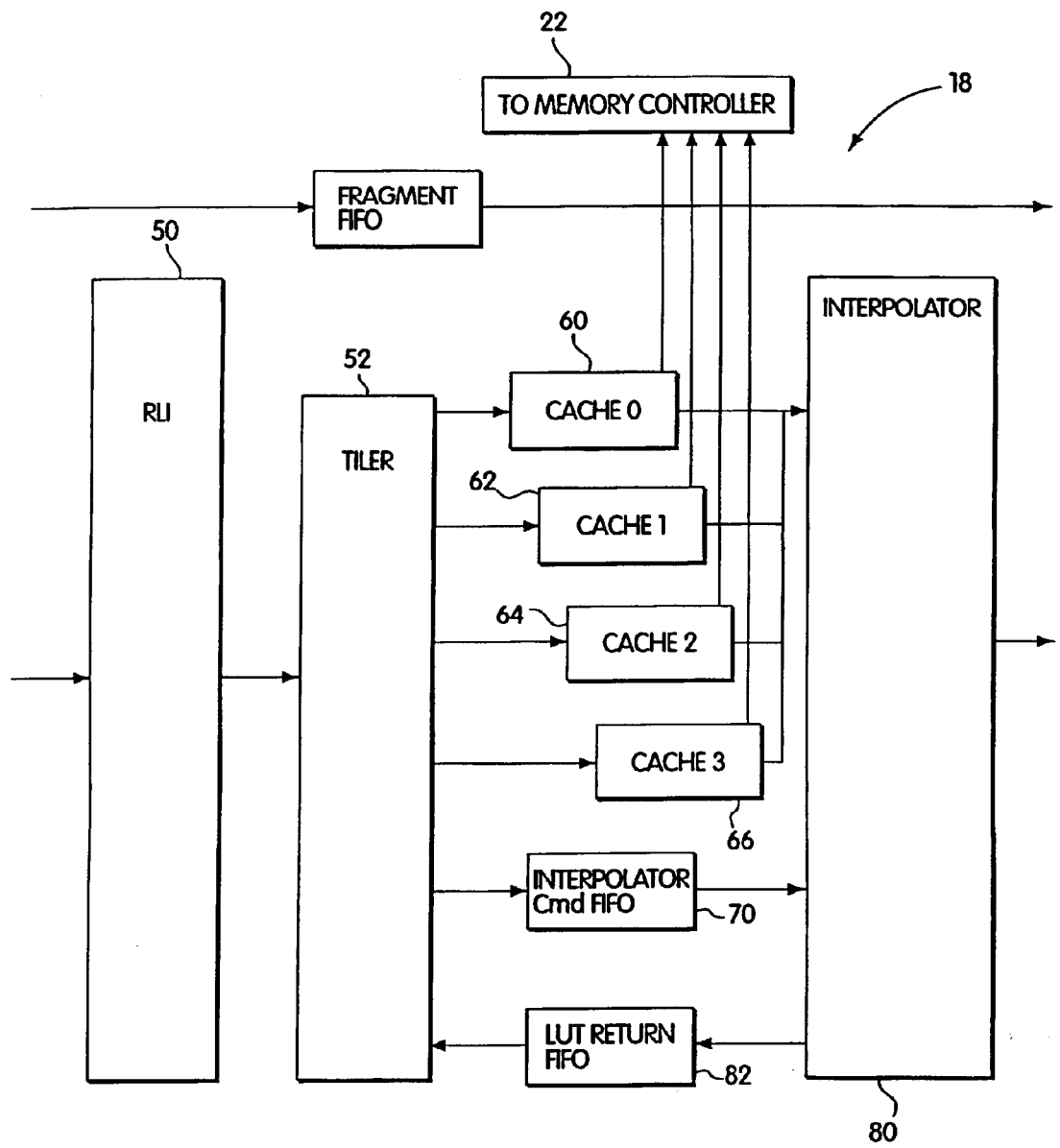
Figure 3:
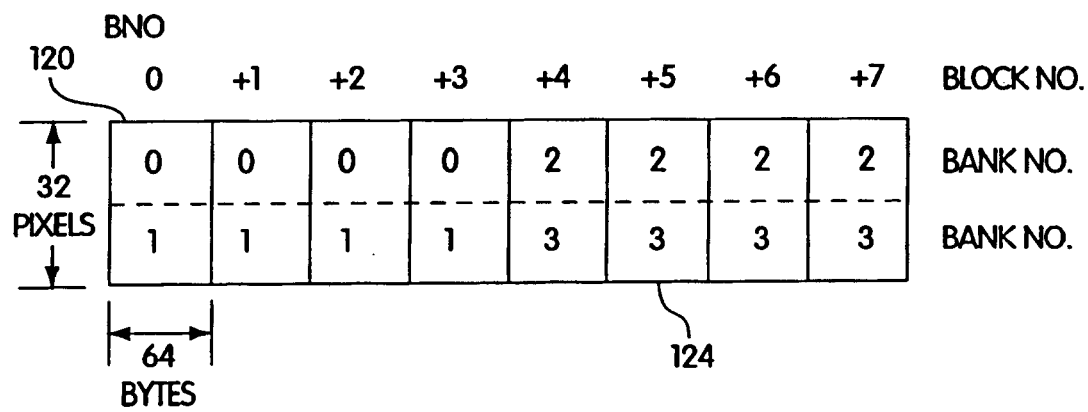

A flow chart of an example of a process for allocating texture maps to memory in accordance with the invention is shown in FIGS. 8A and 8B. In step 300, a determination is made as to whether the operation involves storage of a texture map. When the data array to be allocated to memory is not a texture map, the blocks may be allocated linearly in step 302, as shown in FIGS. 5A–5E and described above. If the data array being mapped is a texture map, a determination is made in step 304 as to whether the block stride of the map is greater than one. If the block stride of the texture map is not greater than one, the blocks are allocated linearly in step 302 as shown in FIG. 6A. When the block stride of the texture map is greater than one, the texture map is divided into left and right areas in step 306. The division of texture maps 212, 214, 216, 218 and 220 into left and right areas is illustrated in FIGS. 6B–6F and is described above. In step 308, a determination is made as to whether the texture map level is even or odd. The assignment of even and odd levels to the texture maps may be made arbitrarily. Where the texture map level is odd, the left area of the map is allocated to the first memory area, and the right area of the map is allocated to the second memory area in step 310. Where the texture map level is even, the left area of the map is allocated to the second memory area and the right area of the map is allocated to the first memory area in step 312. The allocation of the left and right areas to alternating texture maps is described above in connection with FIGS. 6B–6F and FIG. 4. In step 314, a determination is made as to whether the block stride divided by two is greater than the page width. Step 314 determines whether one row of blocks in the left area or the right area of the texture map requires more than one memory page. When the block stride divided by two is not greater than the page width, the process proceeds to step 320. When the block stride divided by two is greater than the page width, the bank allocation in each block of every other page is reversed in step 316. The reversal of bank allocations is described above in connection with FIGS. 6E and 6F. In step 320, a determination is made as to whether another texture map remains to be allocated to memory. When another texture map is to be allocated, the process returns to step 304. Otherwise the process is completed in step 322.

The present invention has been described above in connection with allocating texture data among first and second memory areas. More generally, the invention provides methods and apparatus for allocating correlated data sets to memory. The correlated data sets include at least first and second data sets, each of which is divided into sets of blocks of data. For each of the data sets, at least first and second subsets are defined, wherein the first subsets are correlated and the second subsets are correlated. In addition, at least first and second areas of memory are defined. Blocks of data from the first subset of the first data set and the second subset of the second data set are stored in the first memory area. Blocks of data from the second subset of the first data set and the first subset of the second data set are stored in the second memory area. The blocks of data representing each data set are stored in consecutive blocks of the memory. The correlated data sets may comprise a series of texture maps as described above. In another embodiment, the correlated data sets may comprise an image data set and a Z-data set.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A method for allocating a data array to a memory comprising:
   arranging the memory as a linear array of two-dimensional blocks with consecutive blocks of each row of memory forming an accessible page of memory, wherein each block maps to portions of at least two interleaved memory banks;
   dividing the data array into an array of data blocks each data array block having dimensions that are the same as dimensions of the memory blocks; and
   allocating data array blocks to the memory such that consecutive data blocks of consecutive rows of the data array are stored in consecutive blocks of one or more consecutive pages of memory.

2. The method of claim 1, wherein the data array comprises a texture map, and wherein, prior to allocating data blocks, the method further comprises:
   dividing the memory into first and second contiguous areas each comprising a same portion of each row of memory blocks; and
   dividing the data array into first and second contiguous areas each comprising a same portion of each row of data array blocks,
   wherein allocating data blocks comprises:
      allocating consecutive data array blocks in one or more consecutive rows of the first data array area to consecutive memory blocks in one row of the first memory area; and
      allocating consecutive data array blocks in a same one or more consecutive rows of the second data array area to consecutive memory blocks in a same one row of the second memory area.

3. The method of claim 2, wherein the memory is a frame buffer.

4. The method of claim 1, wherein data stored in the data array comprises one or more of graphics image and depth data.

5. The method of claim 2, wherein dividing the memory comprises:
   dividing the memory into the first and second contiguous areas such that each row of blocks in the memory is equally divided between the first and second memory areas.

6. The method of claim 5, wherein dividing the data array comprises:
   dividing the data array into the first and second contiguous areas such that each row of blocks in the data array is equally divided between into the first and second data array areas.

7. Apparatus for allocating a data array to a memory, comprising:
   means for arranging the memory as a linear array of two-dimensional blocks with consecutive blocks of each row of memory forming an accessible page of memory, wherein each block maps to portions of at least two interleaved memory banks;
   means for dividing the data array into an array of data blocks each data array block having dimensions that are the same as dimensions of the memory blocks; and
   means for allocating data array blocks to the memory such that consecutive data blocks of consecutive rows of the data array are stored in consecutive blocks of one or more consecutive pages of memory.

8. The apparatus of claim 7, wherein the data array comprises a texture map, and wherein the apparatus further comprises:
   means for dividing the memory into first and second contiguous areas each comprising a same portion of each row of memory blocks; and
   means for dividing the data array into first and second contiguous areas each comprising a same portion of each row of data array blocks,
   wherein allocating data blocks comprises:
      allocating consecutive data array blocks in one or more consecutive rows of the first data array area to consecutive memory blocks in one row of the first memory area; and
      allocating consecutive data array blocks in a same one or more consecutive rows of the second data array area to consecutive memory blocks in a same one row of the second memory area.

9. The apparatus of claim 7, wherein the means for dividing the memory into two contiguous areas comprising a same portion of each page of blocks comprises:
   means for dividing the memory into the first and second contiguous areas such that each row of blocks in the memory is equally divided between the first and second memory areas.

10. The method of claim 2, wherein the texture map comprises a series of MIP maps each stored in a different data array, and
    wherein allocating data blocks further comprises:
      alternating the first and second memory areas to which the first and second areas of successive MIP maps are allocated.

11. The method of claim 10, wherein allocating data blocks further comprises:
    alternating the order in which data array blocks are allocated to memory blocks in each row of each area of the memory for successive MIP maps of the series of MIP maps.

12. The method of claim 10, wherein the series of MIP maps are stored in consecutive blocks of the memory.

13. The method of claim 10, wherein the different data arrays comprise non-overlapping areas in one data array device.

14. The method of claim 2, wherein the interleave of the memory banks to which each memory block is mapped is reversed in successive pages of memory when the quantity of successive blocks in a row of the data array is greater than the quantity of blocks in a row of the memory.

15. The method of claim 8, wherein the memory is a frame buffer.

16. The apparatus of claim 9, wherein dividing the data array comprises:
    dividing the data array into the first and second contiguous areas such that each row of blocks in the data array is equally divided between into the first and second data array areas.

17. The apparatus of claim 8, wherein the interleave of the memory banks to which each memory block is mapped is reversed in successive pages of memory when the quantity of successive blocks in a row of the data array is greater than the quantity of blocks in a row of the memory.

18. The apparatus of claim 8, wherein the texture map comprises a series of MIP maps each stored in a different data array, and wherein the means for allocating data blocks alternates the first and second memory areas to which the first and second areas of successive MIP maps are allocated.

19. The apparatus of claim 18, wherein the means for allocating data blocks also alternates the order in which data array blocks are allocated to memory blocks in each row of each area of the memory for successive MIP maps of the series of MIP maps.

20. The apparatus of claim 18, wherein the series of MIP maps are stored in consecutive blocks of the memory.

21. The apparatus of claim 18, wherein the different data arrays comprise non-overlapping areas in one data array device.

22. The method of claim 7, wherein data stored in the data array comprises one or more of graphics image and depth data.

23. A method for allocating a data array of texture mapping data to a frame buffer, comprising:

arranging the frame buffer as a linear array of two-dimensional blocks with consecutive blocks of each row of the frame buffer forming an accessible page of the frame buffer, wherein each frame buffer block maps to portions of at least two interleaved memory banks;

dividing the data array into an array of data blocks each data array block having dimensions that are the same as dimensions of the frame buffer blocks;

dividing the frame buffer and data array into first and second contiguous areas each comprising a same portion of each row of the respective frame buffer and data array;

allocating consecutive data array blocks in one or more consecutive rows of the first data array area to consecutive frame buffer blocks in one row of the first frame buffer area; and allocating consecutive data array blocks in a same one or more consecutive rows of the second data array area to consecutive frame buffer blocks in a same one row of the second frame buffer area.

24. The method of claim 23, wherein each row of blocks in the frame buffer is equally divided between the first and second frame buffer areas, and each row of blocks in the data array is equally divided between into the first and second data array areas.

25. The method of claim 23, wherein the texture map comprises a series of MIP maps each stored in a different data array, and wherein the method further comprises:

alternating the first and second frame buffer areas to which the first and second areas of successive MIP maps are allocated.

26. The method of claim 25, wherein allocating data blocks further comprises:

alternating the order in which data array blocks are allocated to frame buffer blocks in each row of each area of the frame buffer for successive MIP maps of the series of MIP maps.

27. The method of claim 23, wherein the different data arrays comprise non-overlapping areas in one data array device.

28. The method of claim 23, wherein the interleave of the memory banks to which each frame buffer block is mapped is reversed in successive pages of the frame buffer when the quantity of successive blocks in a row of the data array is greater than the quantity of blocks in a row of the frame buffer.

* * * * *

UNITED STATES PATENT AND TRADEMARK OFFICE
CERTIFICATE OF CORRECTION

PATENT NO.    : 6,724,396 B1
DATED         : April 20, 2004
INVENTOR(S)   : Emmot et al.

It is certified that error appears in the above-identified patent and that said Letters Patent is hereby corrected as shown below:

Drawings,
Figs. 1, 2, 3, 4, 5A-5C, 5D-5E, 6A-6C, 6D-6E, 6F, 7A-7B, 7C, 8A and 8B with the Formal Drawings attached hereto.

Signed and Sealed this

Fifth Day of October, 2004

JON W. DUDAS
*Director of the United States Patent and Trademark Office*

| 0 | 1 | 2 | 3 | 4 | 5 | 6 | 7 |
|---|---|---|---|---|---|---|---|
| 8 | 9 | A | B | C | D | E | F |
| 10 | 11 | 12 | 13 | 14 | 15 | 16 | 17 |
| 18 | 19 | 1A | 1B | 1C | 1D | 1E | 1F |

166

⋮

Fig. 5D

BS=16

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| 10 | 11 | 12 | 13 | 14 | 15 | 16 | 17 | 18 | 19 | 1A | 1B | 1C | 1D | 1E | 1F |

168

⋮

Fig. 5E

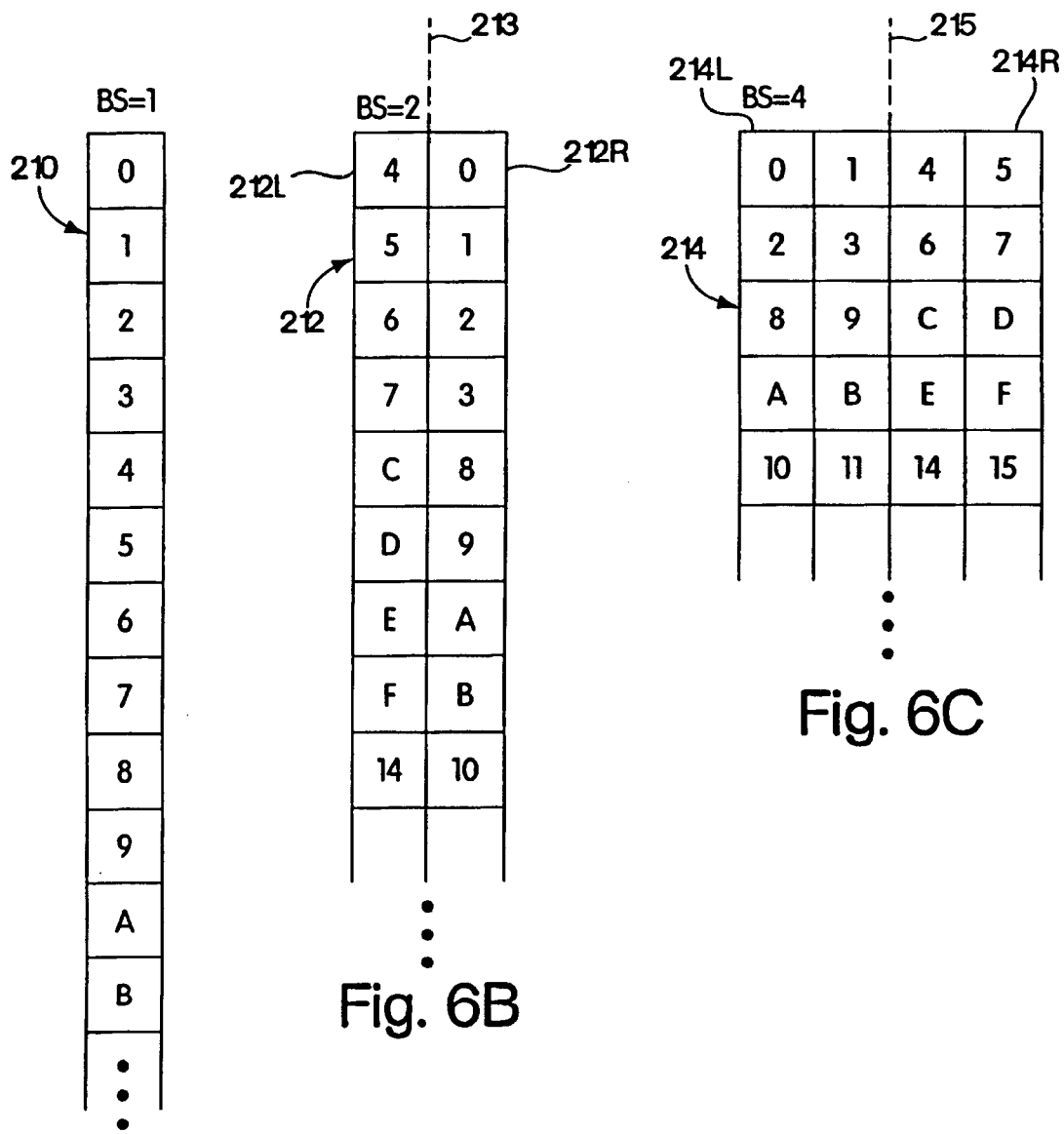

Fig. 6D

Fig. 6E

UNITED STATES PATENT AND TRADEMARK OFFICE
CERTIFICATE OF CORRECTION

PATENT NO. : 6,724,396 B1
DATED : April 20, 2004
INVENTOR(S) : Emmot et al.

It is certified that error appears in the above-identified patent and that said Letters Patent is hereby corrected as shown below:

<u>Column 11, line 66 - Column 13, line 24,</u>
Claims 7-18, should read as follows:
7. The method of claim 2, wherein the texture map comprises a series of MIP maps each stored in a different data array, and wherein allocating data blocks further comprises:
  alternating the first and second memory areas to which the first and second areas of successive MIP maps are allocated.

8. The method of claim 7, wherein allocating data blocks further comprises:
  alternating the order in which data array blocks are allocated to memory blocks in each row of each area of the memory for successive MIP maps of the series of MIP maps 9. The method of claim 7, wherein the series of MIP maps are stored in consecutive blocks of the memory.

10. The method of claim 7, wherein the different data arrays comprise non-overlapping areas in one data array device.

11. The method of claim 2, wherein the interleave of the memory banks to which each memory block is mapped is reversed in successive pages of memory when the quantity of successive blocks in a row of the data array is greater than the quantity of blocks in a row of the memory.

12. Apparatus for allocating a data array to a memory, comprising:
  means for arranging the memory as a linear array of two-dimensional blocks with consecutive blocks of each row of memory forming an accessible page of memory, wherein each block maps to portions of at least two interleaved memory banks;
  means for dividing the data array into an array of data blocks each data array block having dimensions that are the same as dimensions of the memory blocks; and
  means for allocating data array blocks to the memory such that consecutive data blocks of consecutive rows of the data array are stored in consecutive blocks of one or more consecutive pages of memory.

UNITED STATES PATENT AND TRADEMARK OFFICE
CERTIFICATE OF CORRECTION

| | |
|---|---|
| PATENT NO. | : 6,724,396 B1 |
| DATED | : April 20, 2004 |
| INVENTOR(S) | : Emmot et al. |

It is certified that error appears in the above-identified patent and that said Letters Patent is hereby corrected as shown below:

<u>Column 11, line 66 - Column 13, line 24 (cont'd),</u>
13. The apparatus of claim 12. wherein the data array comprises a texture map, and wherein the apparatus further comprises:
    means for dividing the memory into first and second contiguous areas each comprising a same portion of each row of memory blocks; and
    means for dividing the data array into fast and second contiguous areas each comprising a same portion of each row of data array blocks,
      wherein said means for allocating data blocks comprises:
      means for allocating consecutive data array blocks in one or more consecutive rows of the first data array area to consecutive memory blocks in one row of the first memory area; and
        means for allocating consecutive data array blocks in a same one or more consecutive rows of the second data array area to consecutive memory blocks in a same one row of the second memory area.

14. The apparatus of claim 13, wherein the means for dividing the memory into first and second contiguous areas each comprising a same portion of each row of memory blocks comprises:
      means for dividing the memory into the first and second contiguous areas such that each row of blocks in the memory is equally divided between the first and second memory areas.

15. The apparatus of claim 13, wherein the memory is a frame buffer.

16. The apparatus of claim 14 wherein said means for dividing the data array comprises:
      means for dividing the data array into the first and second contiguous areas such that each row of blocks in the data array is equally divided between into the first and second data array areas.

17. The apparatus of claim 13, wherein the interleave of the memory banks to which each memory block is mapped is reversed in successive pages of memory when the quantity of successive blocks in a row of the data array is greater than the quantity of blocks in a row of the memory.

18. The apparatus of claim 13, wherein the texture map comprises a series of MIP maps each stored in a different data array, and wherein the means for allocating data blocks alternates the first and second memory areas to which the first and second areas of successive MIP maps are allocated.

UNITED STATES PATENT AND TRADEMARK OFFICE
CERTIFICATE OF CORRECTION

PATENT NO. : 6,724,396 B1
DATED : April 20, 2004
INVENTOR(S) : Emmot et al.

It is certified that error appears in the above-identified patent and that said Letters Patent is hereby corrected as shown below:

Column 13,
Lines 22-24, Claim 22, should read as follows:
22. The apparatus of claim 12, wherein data stored in the data array comprises one or more of graphics image and depth data.

Signed and Sealed this

Eighth Day of February, 2005

JON W. DUDAS
*Director of the United States Patent and Trademark Office*